(12) United States Patent
Ling et al.

(10) Patent No.: US 10,158,142 B1
(45) Date of Patent: Dec. 18, 2018

(54) LITHIUM COMPOSITE COMPOUNDS WITH ANIONIC FRAMEWORK ISOSTRUCTURAL TO LAVES MG$_2$CU LATTICE AS SOLID LI-ION CONDUCTORS

(71) Applicant: Toyota Motor Engineering & Manufacturing North America, Inc., Erlanger, KY (US)

(72) Inventors: Chen Ling, Ann Arbor, MI (US); Ying Zhang, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/626,696

(22) Filed: Jun. 19, 2017

(51) Int. Cl.
*H01M 4/00* (2006.01)
*H01M 10/0525* (2010.01)
*H01M 4/36* (2006.01)
*H01M 10/0562* (2010.01)

(52) U.S. Cl.
CPC ....... *H01M 10/0525* (2013.01); *H01M 4/362* (2013.01); *H01M 10/0562* (2013.01); *H01M 2300/0065* (2013.01)

(58) Field of Classification Search
CPC ...................................................... H01M 4/00
See application file for complete search history.

(56) References Cited

U.S. PATENT DOCUMENTS

2015/0364747 A1* 12/2015 Elam .................. H01M 4/0426
204/192.1

* cited by examiner

*Primary Examiner* — Jacob B Marks
(74) *Attorney, Agent, or Firm* — Oblon, McClelland, Maier & Neustadt, L.L.P.

(57) ABSTRACT

A series of solid-state lithium ion composite electrolytes is described. The composite materials have lithium ions in an anionic framework wherein the anionic framework has lithium ion vacancies or interstitial Li$^+$ sites. The anionic framework lattice is isostructural to a Laves Mg$_2$Cu lattice and the lithium ion (Li$^+$) conductivity of the solid state lithium ion electrolyte is at least $10^{-4}$ S/cm. The activation energy for lithium ion migration in the solid state lithium ion electrolyte is 0.36 sV or less. Composites of specific formulae are provided.

13 Claims, 5 Drawing Sheets

LITHIUM COMPOSITE COMPOUNDS WITH ANIONIC FRAMEWORK ISOSTRUCTURAL TO LAVES MG$_2$CU LATTICE AS SOLID LI-ION CONDUCTORS

BACKGROUND

Li-ion batteries have traditionally dominated the market of portable electronic devices. However, conventional Li-ion batteries contain flammable organic solvents as components of the electrolyte and this flammability is the basis of a safety risk which is of concern and could limit or prevent the use of Li-ion batteries for application in large scale energy storage.

Replacing the flammable organic liquid electrolyte with a solid Li-conductive phase would alleviate this safety issue, and may provide additional advantages such as improved mechanical and thermal stability. A primary function of the solid Li-conductive phase, usually called solid Li-ion conductor or solid state electrolyte, is to conduct Li$^+$ ions from the anode side to the cathode side during discharge and from the cathode side to the anode side during charge while blocking the direct transport of electrons between electrodes within the battery.

Moreover, lithium batteries constructed with nonaqueous electrolytes are known to form dendritic lithium metal structures projecting from the anode to the cathode over repeated discharge and charge cycles. If and when such a dendrite structure projects to the cathode and shorts the battery energy is rapidly released and may initiate ignition of the organic solvent.

Therefore, there is much interest and effort focused on the discovery of new solid Li-ion conducting materials which would lead to an all solid state lithium battery. Studies in the past decades have focused mainly on ionically conducting oxides such as for example, LISICON (Li$_{14}$ZnGe$_4$O$_{16}$), NASICON(Li$_{1.3}$Al$_{0.3}$Ti$_{1.7}$(PO$_4$)$_3$), perovskite (for example, La$_{0.5}$Li$_{0.5}$TiO$_3$), garnet (Li$_7$La$_3$Zr$_2$O$_{12}$), LiPON (for example, Li$_{2.88}$PO$_{3.73}$N$_{0.14}$) and sulfides, such as, for example, Li$_3$PS$_4$, Li$_7$P$_3$S$_{11}$ and LGPS (Li$_{10}$GeP$_2$S$_{12}$).

While recent developments have marked the conductivity of solid Li-ion conductor to the level of 1-10 mS/cm, which is comparable to that in liquid phase electrolyte, finding new Li-ion solid state conductors is of great interest.

An effective lithium ion solid-state conductor will have high Li$^+$ conductivity at room temperature and low activation energy of Li$^+$ migration in the conductor for use over a range of operation temperatures that might be encountered in the environment. Further, unlike many conventionally employed non-aqueous solvents, the solid-state conductor material should be stable to electrochemical degradation reactivity with the anode and cathode chemical composition. Environmentally stable composite materials having high Li$^+$ conductivity and low activation energy would be sought in order to facilitate manufacturing methods and structure of the battery.

Accordingly, an object of this application is to identify materials having high Li ion conductivity while being poor electron conductors which are suitable as a solid state electrolyte for a lithium ion battery.

A further object of this application is to provide a solid state lithium ion battery containing a solid state Li ion electrolyte membrane.

SUMMARY OF THE EMBODIMENTS

These and other objects are provided by the embodiments of the present application, the first embodiment of which includes a solid-state lithium ion electrolyte, comprising: a composite material of lithium ions in an anionic framework; wherein the anionic framework comprises lithium ion vacancies or interstitial Li$^+$ sites, the anionic framework lattice is isostructural to a Laves Mg$_2$Cu lattice, a lithium ion (Li$^+$) conductivity of the solid state lithium ion electrolyte is at least 10$^{-4}$ S/cm, and an activation energy for lithium ion migration in the solid state lithium ion electrolyte is 0.36 sV or less.

An aspect of the first embodiment includes a solid-state lithium ion electrolyte of formula (I):

$$\text{Li}_{9-x-2m}\text{M}_m\text{X}_x\text{N}_{3-x} \quad (I)$$

wherein M is a cation of +2 charge, X is at least one of S, Se and Te, m is a number from 0 to 1, x is a number from 1 to 1.25, and the anionic framework of the composite material isostructural to a Laves Mg$_2$Cu lattice comprises Li$^+$ vacancies.

A second aspect of the first embodiment includes a solid-state lithium ion electrolyte according to of formula (Ia):

$$\text{Li}_{9-x}\text{X}_x\text{N}_{3-x} \quad (Ia)$$

wherein x is a number from 1 to 1.25 and the Li$^+$ vacancies are present due to substitution of X atoms with N.

A third aspect of the first embodiment includes a solid-state lithium ion electrolyte of formula (II):

$$\text{Li}_2\text{In}_2\text{SiS}_6 \quad (II)$$

wherein the anionic framework isostructural to a Laves Mg$_2$Cu lattice comprises interstitial Li$^+$ sites.

A further aspect of the first embodiment includes a solid-state lithium ion electrolyte of formula (IIa):

$$\text{Li}_{2+3z}\text{In}_{2-z}\text{SiS}_6 \quad (IIa)$$

wherein z is a number from 0.01 to 0.375.

In a second embodiment a solid state lithium battery is included. The solid state lithium battery comprises: an anode; a cathode; and a solid state lithium ion electrolyte located between the anode and the cathode: wherein the solid state lithium ion electrolyte comprises a composite material according to any of the aspects of the first embodiment.

The forgoing description is intended to provide a general introduction and summary of the present invention and is not intended to be limiting in its disclosure unless otherwise explicitly stated. The presently preferred embodiments, together with further advantages, will be best understood by reference to the following detailed description taken in conjunction with the accompanying drawings.

DESCRIPTION OF THE PREFERRED EMBODIMENTS

Throughout this description, the terms "electrochemical cell" and "battery" may be employed interchangeably unless the context of the description clearly distinguishes an electrochemical cell from a battery. Further the terms "solid-state electrolyte" and "solid-state ion conductor" may be employed interchangeably unless explicitly specified differently.

Structural characteristics of effective $Li^+$ conducting crystal lattices have been described by Ceder et al. (Nature Materials, 14, 2015, 1026-1031) in regard to known $Li^+$ ion conductors $Li_{10}GeP_2S_{12}$ and $Li_7P_3S_{11}$, where the sulfur sublattice of both materials was shown to very closely match a bcc lattice structure. Further, $Li^+$ ion hopping across adjacent tetrahedral coordinated $Li^+$ lattice sites was indicated to offer a path of lowest activation energy.

The inventors have investigated new lithium composite compounds in order to identify materials having the properties described above which may serve as solid-state electrolytes in solid state lithium batteries. In this discovery effort, ab initio molecular dynamics simulation studies were applied to calculate the diffusivity of Li in the lattice structure. In order to accelerate the simulation, the calculation was performed at high temperatures.

Based on these studies, composite materials having identified structural and lithium ion characteristics making the composite materials suitable as solid electrolytes have been discovered.

Within the course of the study the stoichiometric compounds $Li_8XN_2$ ($Li_8SN_2$, $Li_8SeN_2$, $Li_8TeN_2$) and $Li_2In_2SiS_6$ were evaluated for lithium ion diffusivity wherein the effect of excess Li or Li vacancy was considered. In order to create excess Li or Li vacancy, aliovalent replacement of cation or anions was evaluated. For example, for a $Li_8XN_2$ composite, Li vacancy was created by partially substituting $N^{3-}$ anion for $X^{2-}$ ($S^{2-}$, $Se^{2-}$, $Te^{2-}$) anion. Li vacancies may also be created by partially replacing $Li^+$ cation with higher valent cations such as $Mg^{+2}$. For composites of the formula $Li_2In_2SiS_6$, excess interstitial Li was introduced by partially replacing $In^{3+}$ with $Li^+$ cation.

Figure 1:
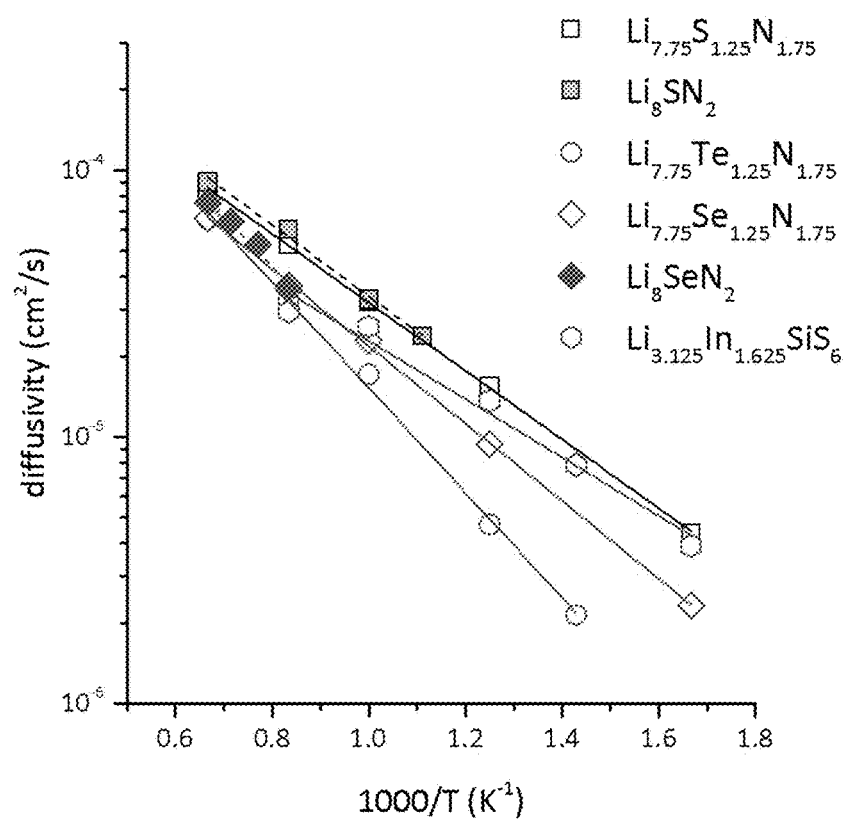
FIG. 1 shows a graph of diffusivity of Li$^+$ relative to temperature for obtained from ab initio molecular dynamics simulation for selected embodiments.

FIG. 1 shows the calculated diffusivity related to temperature for these composite materials. In the temperature range of 600-1500 K, the diffusivity for all compounds is in the order of $10^{-4}$ to $10^{-6}$ $cm^2/s$, and shows good Arrhenius dependence on temperature. The diffusivity at 300 K was determined according to equation (I)

$$D = D_0 \exp(-E_a/k_b T) \qquad \text{equation (I)}$$

where $D_0$, $E_a$ and $k_b$ are the pre-exponential factor, activation energy and Boltzmann constant, respectively. The conductivity is related with the calculated diffusivity according to equation (II):

$$\sigma = D_{300} \rho e^2 / k_b T \qquad \text{equation (II)}$$

where $\rho$ is the volumetric density of Li ion and e is the unit charge.

Table 1 lists the activation energy barrier, $D_{300}$, $\rho$ and the conductivity at 300 K for these compounds. All of them show conductivities of the order of 0.1-10 mS/cm, which indicates the composites may be suitable as $Li^+$ solid state electrolytes.

TABLE 1

| Compound | composition | $E_a$ (eV) | $D_{300}$ ($cm^2/s$) | $\sigma$ (mS/cm) | $\rho$ (Å$^{-3}$) |
|---|---|---|---|---|---|
| $Li_8SN_2$ | $Li_{7.75}S_{1.25}N_{1.75}$ | 0.252 | 3.28E-8 | 12.79 | 0.063 |
|  | $Li_8SN_2$ | 0.35 | 2.10E-9 | 0.85 | 0.065 |
| $Li_8SeN_2$ | $Li_{7.75}Se_{1.25}N_{1.75}$ | 0.286 | 9.83E-9 | 3.79 | 0.062 |
|  | $Li_8SeN_2$ | 0.384 | 5.43E-10 | 0.22 | 0.064 |
| $Li_8TeN_2$ | $Li_{7.75}Te_{1.25}N_{1.75}$ | 0.388 | 4.25E-10 | 0.15 | 0.057 |
| $Li_2In_2SiS_6$ | $Li_{3.125}In_{1.625}SiS_6$ | 0.284 | 1.40E-8 | 1.17 | 0.012 |

Figure 2:
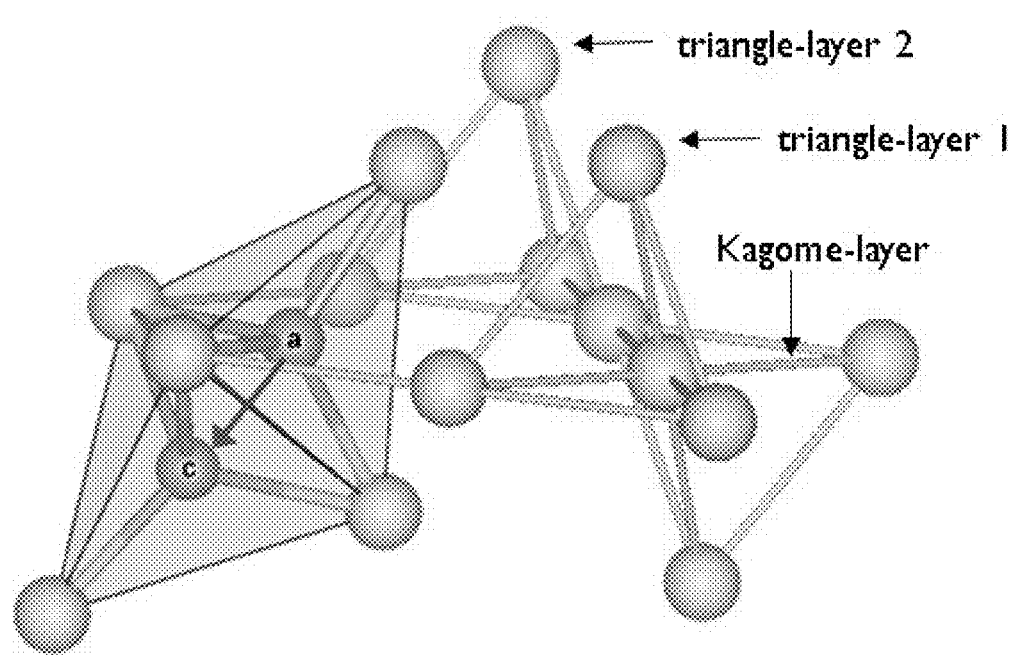
FIG. 2 shows a model of a Laves Mg$_2$Cu-type anionic lattice.
Figure 3:
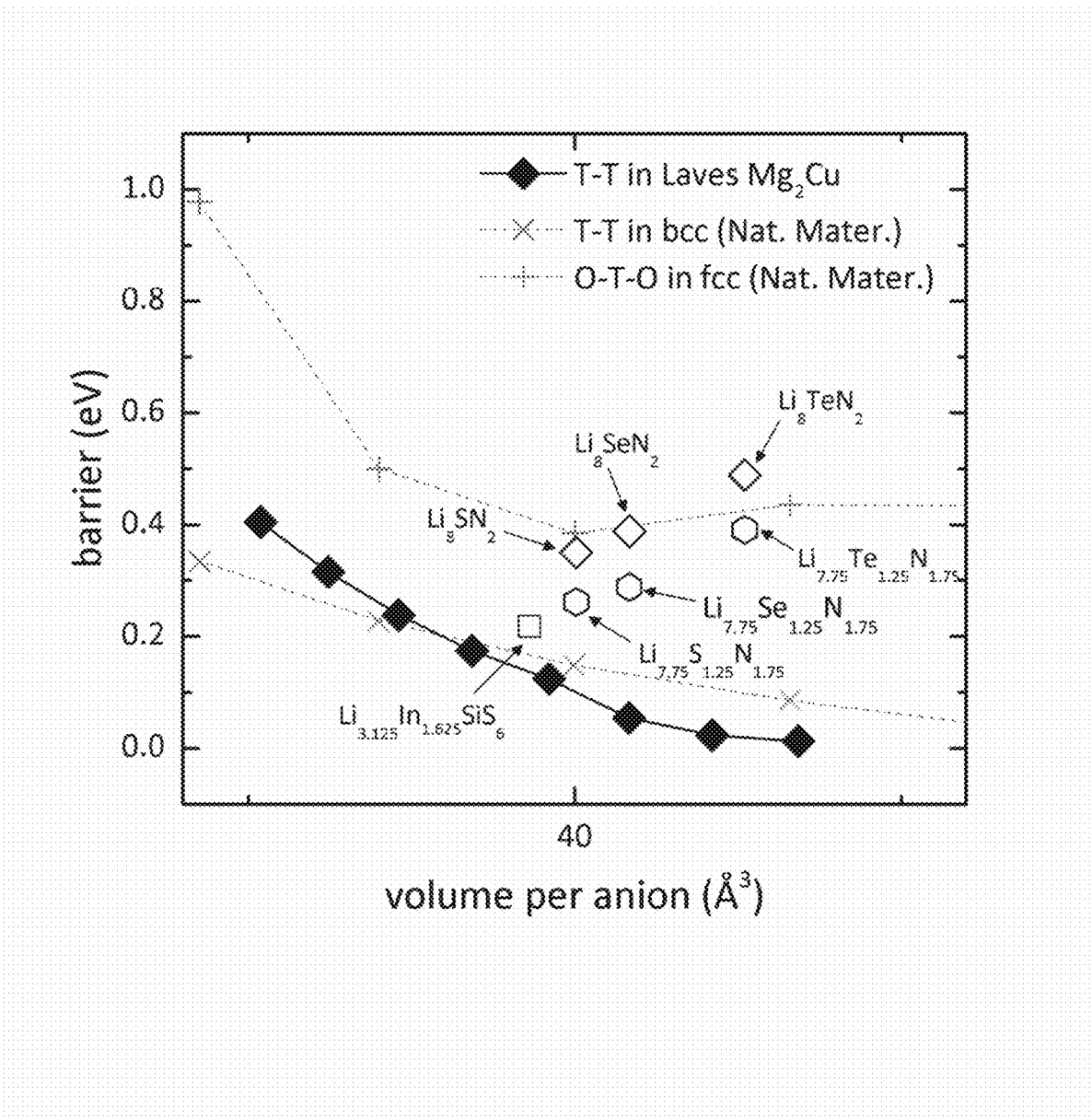
FIG. 3 shows variation of action energy barrier for the hopping in ideal Mg$_2$Cu-type anionic lattices and Li$_a$XN$_2$ compounds.

The inventors have surprisingly discovered that the anions in the compounds of formulae (I) and (II), as shown below, X, N and S form a lattice isostructural to Laves $Mg_2Cu$, where the anions are packed as two triangular layers and one Kagome layer (FIG. 2). Li atoms in these compounds occupy tetrahedral interstitial sites and the hopping occurs between adjacent tetrahedral sites (T) as shown by the arrow from $T_a$ to $T_c$. The activation energy barrier ($E_a$ (eV)) for $Li^+$ T-to-T hopping in an ideal $Mg_2Cu$-type lattice was calculated and compared with the values for fcc-, bcc-, and hcp-lattice reported by Ceder et al. As shown in FIG. 3, the barriers in $Mg_2Cu$-type lattice are generally comparable to that in a bcc-lattice, which was suggested to be superior for $Li^+$-conduction, and lower than those in fcc- and hcp-lattice. This result explains the mechanism of high Li-ion conductivity in these compounds, and suggests that a Laves $Mg_2Cu$-type crystal lattice may be an anionic framework useful as solid-state Li-ion conductors.

Accordingly, in the first embodiment, the present application provides a solid-state lithium ion electrolyte, comprising: a composite material of lithium ions in an anionic framework; wherein the anionic framework comprises lithium ion vacancies or interstitial $Li^+$ sites, the anionic framework lattice is isostructural to a Laves $Mg_2Cu$ lattice, a lithium ion ($Li^+$) conductivity of the solid state lithium ion electrolyte is at least $10^{-4}$ S/cm, and an activation energy for lithium ion migration in the solid state lithium ion electrolyte is 0.36 sV or less.

In an aspect of this embodiment the present application provides a solid-state lithium ion electrolyte within the first embodiment of formula (I):

$$Li_{9-x-2m}M_mX_xN_{3-x} \qquad (I)$$

wherein M is a cation of charge greater than +1, X is at least one of S, Se and Te, m is a number from 0 to 1, x is a number from 1 to 1.25, and the anionic framework of the composite material isostructural to a Laves $Mg_2Cu$ lattice comprises $Li^+$ vacancies.

In a second aspect of the first embodiment a solid-state lithium ion electrolyte of formula (I) is included, wherein M is a least one selected from the group consisting of Be, Mg, Ca, Sr, Ba and Zn, and m is from greater than 0 to 1.

In a further aspect of the first embodiment a solid-state lithium ion electrolyte of formula (I) is included, wherein m is 0, and at least one of the X atoms is substituted with an anion of valency greater than 2. The at least one X atom may be an atom selected from the group consisting of N, P and As. In a special case of this aspect, the solid-state lithium ion electrolyte is of formula (Ia):

$$Li_{9-x}X_xN_{3-x} \qquad (Ia)$$

wherein x is a number from 1 to 1.25 and the $Li^+$ vacancies are present due to substitution of X atoms with N.

In a further aspect of the first embodiment, the solid-state lithium ion electrolyte is of formula (II):

$$Li_2In_2SiS_6 \qquad (II)$$

wherein the anionic framework isostructural to a Laves Mg$_2$Cu lattice comprises interstitial Li$^+$ sites.

In a further case of this aspect, the solid-state lithium ion electrolyte of formula (IIa) is provided:

$$Li_{2+z}In_{2-z}SiS_6 \qquad (IIa)$$

wherein z is a number from 0.01 to 0.375.

Figure 4:
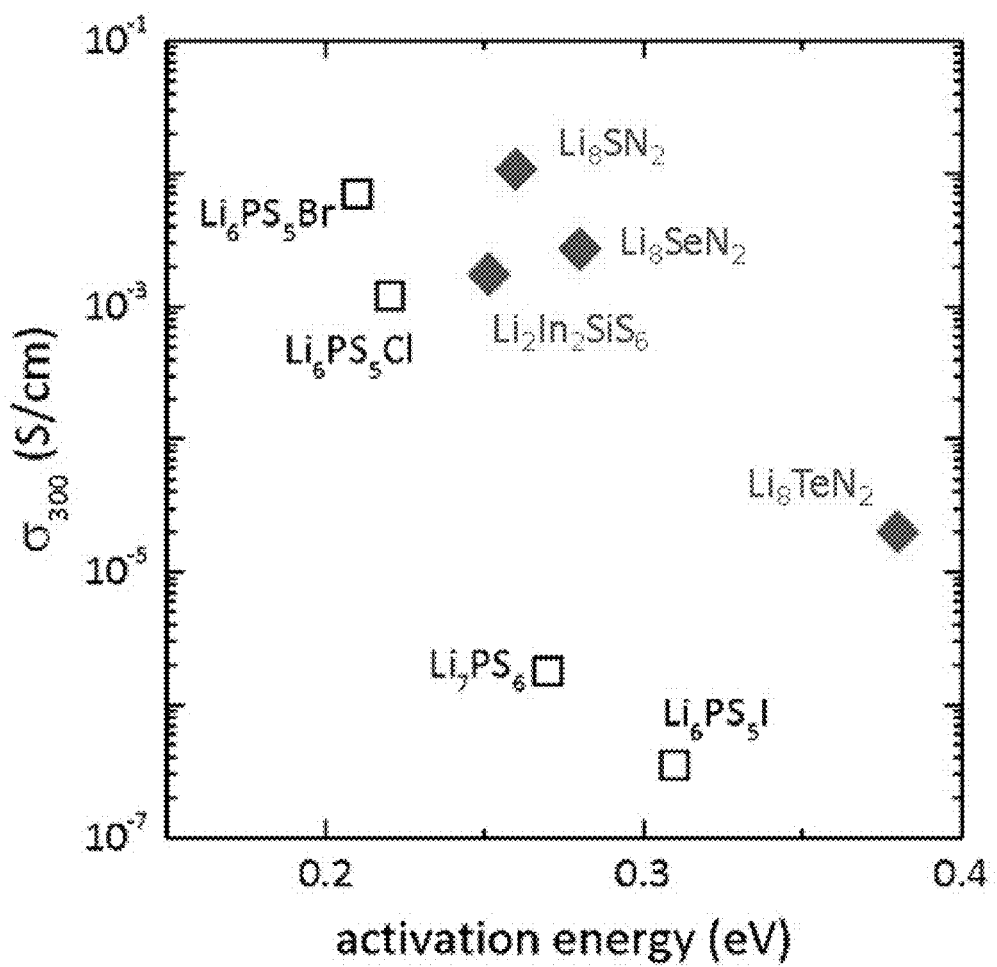
FIG. 4 shows the conductivity and activation energy barrier for Argyrodite and for composites of the embodiments described herein.

For comparison, the inventors searched for other compounds with anion framework isostructural to Laves Mg2Cu. In this regard the Argyrodite compounds Li$_6$PS$_5$X (X=Cl, Br, I) and Li$_7$PS$_6$ were noted to have similar anion lattice. These compounds were previously reported as superionic conductors (Badhman et al. Inorganic Solid-State Electrolytes for Lithium Batteries: Mechanisms and Properties Governing Ion Conduction, Chem. Rev. 2016, 116, 140-162). FIG. 4 compares the conductivity and activation energy barriers of these compounds with the composites of formulae (I) and (II). Clearly, the composite materials according to the embodiments described herein show comparable or better conductivity than the Argyrodite compounds reported.

Synthesis of the composite materials of the first and second embodiments may be achieved by solid state reaction between stoichiometric amounts of selected precursor materials. For example, the doped composites of the formula Li$_{7.75}$X$_{1.25}$N$_{1.75}$, corresponding to the composites Li$_8$SeN$_2$ and Li$_8$TeN$_2$ may be obtainable by solid state reaction between stoichiometric combination of Li$_2$Se or Li$_2$Te and Li$_3$N. To predict the stability of these compounds, the inventors have calculated the formation energy (E$_f$) of Li$_8$XN$_2$ as compared to a mixture of Li$_2$X and Li$_3$N. The calculated E$_f$ was 29.3, 1.3 and −26.5 meV per atom for X=S, Se and Te, consistent with the described experimental synthesis of Li$_8$SeN$_2$ and Li$_8$TeN$_2$ (Synthesis, Crystal Structure and Li Motion of Li$_8$SeN$_2$ and Li$_8$TeN$_2$. Zeitschrift fur Anorganische und Allgemeine Chemie, 2010, <10.1002/zaac.201000002>). The low positive formation energy of Li$_8$SN$_2$ may be compensated by thermal energy.

Figure 5:
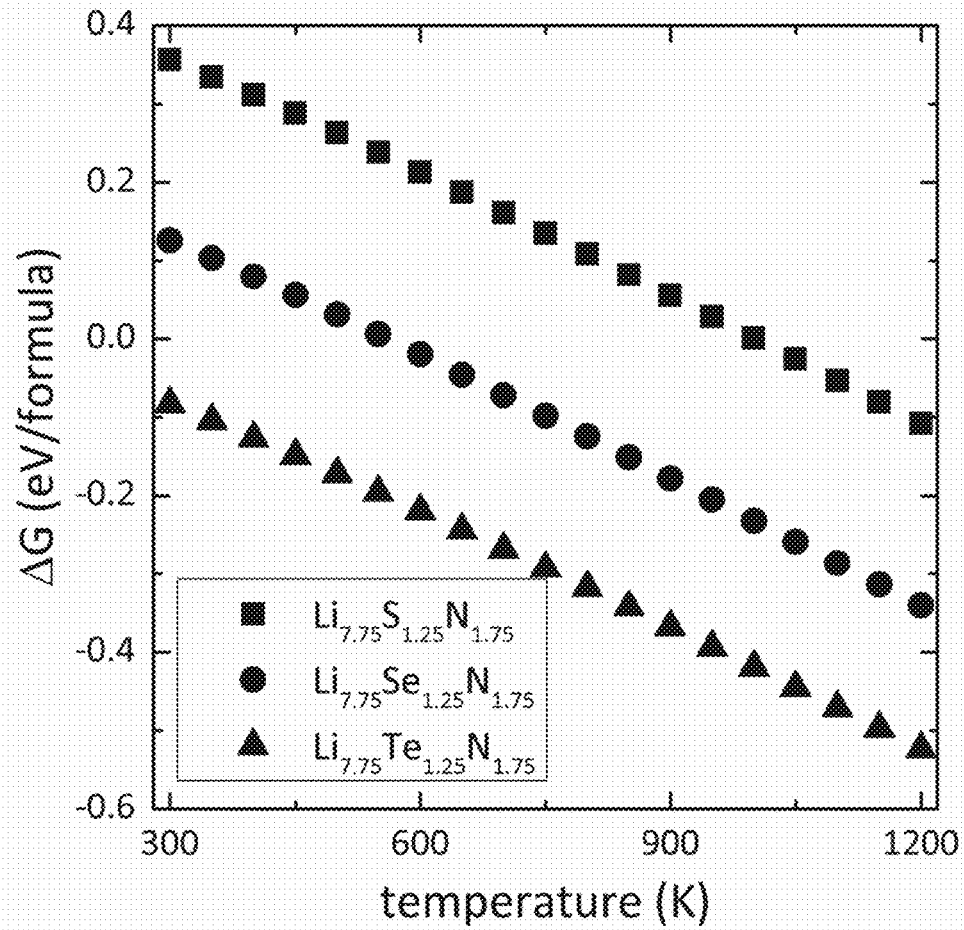
FIG. 5 shows determined free energy values to form Li$_{7.75}$X$_{1.25}$N$_{1.75}$s according to embodiments of this application.

Increasing the concentration of Li vacancy leads to higher contribution of configurational entropy, which benefits the thermodynamic stability. To evaluate the stability of doped compound, the inventors considered all possible ordering within one unit cell and obtained the free energy change from a mixed Li$_2$X and Li$_3$N to the off-stoichiometric compound. The results are shown in FIG. 5, where Li$_{7.75}$Te$_{1.25}$N$_{1.75}$ is stable in the entire temperature range, while Li$_{7.75}$Se$_{1.25}$N$_{1.75}$ and Li$_{7.75}$S$_{1.25}$N$_{1.75}$ are stable at temperatures higher than 550 and 950 K, respectively. These temperatures are lower than that to synthesize undoped Li$_8$SeN$_2$ and Li$_8$TeN$_2$ (1023 K). Hence, a temperature of 1023K may be appropriate to synthesize doped Li$_8$SeN$_2$ and Li$_8$TeN$_2$ as well.

In further embodiments, the present application includes solid state lithium ion batteries containing the solid-state electrolytes described above. Solid-state batteries of these embodiments including metal-metal solid-state batteries may have higher charge/discharge rate capability and higher power density than classical batteries and may have the potential to provide high power and energy density.

Thus in further embodiments, solid-state batteries comprising: an anode; a cathode; and a solid state lithium ion electrolyte according to the embodiments described above, located between the anode and the cathode are provided.

The anode may be any anode structure conventionally employed in a lithium ion battery. Generally such materials are capable of insertion and extraction of Li$^+$ ions. Example anode active materials may include graphite, hard carbon, lithium titanate (LTO), a tin/cobalt alloy and silicon/carbon composites. In one aspect the anode may comprise a current collector and a coating of a lithium ion active material on the current collector. Standard current collector materials include but are not limited to aluminum, copper, nickel, stainless steel, carbon, carbon paper and carbon cloth. In an aspect advantageously arranged with the solid-state lithium ion conductive materials described in the first and second embodiments, the anode may be lithium metal or a lithium metal alloy, optionally coated on a current collector. In one aspect, the anode may be a sheet of lithium metal serving both as active material and current collector.

The cathode structure may be any conventionally employed in lithium ion batteries, including but not limited to composite lithium metal oxides such as, for example, lithium cobalt oxide (LiCoO$_2$), lithium manganese oxide (LiMn$_2$O$_4$), lithium iron phosphate (LiFePO$_4$) and lithium nickel manganese cobalt oxide. Other active cathode materials may also include elemental sulfur and metal sulfide composites. The cathode may also include a current collector such as copper, aluminum and stainless steel.

In one aspect, the active cathode material may be a transition metal, preferably, silver or copper. A cathode based on such transition metal may not include a current collector.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A solid-state lithium ion electrolyte, comprising:
   a composite material of lithium ions in an anionic framework;
   wherein
   the anionic framework comprises lithium ion vacancies or interstitial Li$^+$ sites,
   the anionic framework lattice is isostructural to a Laves Mg$_2$Cu lattice,
   a lithium ion (Li$^+$) conductivity of the solid state lithium ion electrolyte is at least 10$^{-4}$ S/cm, and
   an activation energy for lithium ion migration in the solid state lithium ion electrolyte is 0.36 sV or less.

2. The solid-state lithium ion electrolyte according to claim 1 of formula (I):

$$Li_{9-x-2m}M_mX_xN_{3-x} \qquad (I)$$

wherein M is a cation of +2 charge, X is at least one of S, Se and Te, m is a number from 0 to 1, x is a number from 1 to 1.25, and the anionic framework of the composite material isostructural to a Laves Mg$_2$Cu lattice comprises Li$^+$ vacancies.

3. The solid-state lithium ion electrolyte according to claim 2, wherein M is a least one selected from the group consisting of Be, Mg, Ca, Sr, Ba and Zn, and m is from greater than 0 to 1.

4. The solid-state lithium ion electrolyte according to claim 2, wherein m is 0, and at least one of the X atoms is substituted with an anion of valency greater than 2.

5. The solid-state lithium ion electrolyte according to claim 4, wherein the at least one X atom is substituted with an atom selected from the group consisting of N, P and As.

6. The solid-state lithium ion electrolyte according to claim 5 of formula (Ia):

$$Li_{9-x}X_xN_{3-x} \tag{Ia}$$

wherein x is a number from 1 to 1.25 and the Li$^+$ vacancies are present due to substitution of X atoms with N.

7. The solid-state lithium ion electrolyte according to claim 1 of formula (II):

$$Li_2In_2SiS_6 \tag{II}$$

wherein the anionic framework isostructural to a Laves Mg$_2$Cu lattice comprises interstitial Li$^+$ sites.

8. The solid-state lithium ion electrolyte according to claim 7 of formula (IIa):

$$Li_{2+3z}In_{2-z}SiS_6 \tag{IIa}$$

wherein z is a number from 0.01 to 0.375.

9. A solid state lithium battery, comprising:
an anode;
a cathode; and
a solid state lithium ion electrolyte located between the anode and the cathode;
wherein
the solid state lithium ion electrolyte comprises the composite material of claim 1.

10. A solid state lithium battery, comprising:
an anode;
a cathode; and
a solid state lithium ion electrolyte located between the anode and the cathode;
wherein
the solid state lithium ion electrolyte comprises the composite material of claim 2.

11. A solid state lithium battery, comprising:
an anode;
a cathode; and
a solid state lithium ion electrolyte located between the anode and the cathode;
wherein
the solid state lithium ion electrolyte comprises the composite material of claim 6.

12. A solid state lithium battery, comprising:
an anode;
a cathode; and
a solid state lithium ion electrolyte located between the anode and the cathode;
wherein
the solid state lithium ion electrolyte comprises the composite material of claim 7.

13. A solid state lithium battery, comprising:
an anode;
a cathode; and
a solid state lithium ion electrolyte located between the anode and the cathode;
wherein
the solid state lithium ion electrolyte comprises the composite material of claim 8.

* * * * *